(12) United States Patent
Ding et al.

(10) Patent No.: US 8,751,853 B2
(45) Date of Patent: Jun. 10, 2014

(54) QUAD-DATA RATE CONTROLLER AND IMPLEMENTING METHOD THEREOF

(75) Inventors: Jishan Ding, Shenzhen (CN); Wei Huang, Shenzhen (CN); Wei Lai, Shenzhen (CN); Jianbing Wang, Shenzhen (CN); Kedong Yu, Shenzhen (CN); Zhiyong Liao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/496,606

(22) PCT Filed: Dec. 22, 2010

(86) PCT No.: PCT/CN2010/080140
§ 371 (c)(1),
(2), (4) Date: Mar. 16, 2012

(87) PCT Pub. No.: WO2011/143913
PCT Pub. Date: Nov. 24, 2011

(65) Prior Publication Data
US 2013/0061083 A1 Mar. 7, 2013

(30) Foreign Application Priority Data
May 21, 2010 (CN) .......................... 2010 1 0182594

(51) Int. Cl.
*G06F 1/12* (2006.01)
(52) U.S. Cl.
USPC ......................................... 713/400; 713/500
(58) Field of Classification Search
USPC ................................................ 713/400, 500
See application file for complete search history.

(56) References Cited

U.S. PATENT DOCUMENTS

| 6,424,198 B1 | 7/2002 | Wolford |
| 2005/0273564 A1 | 12/2005 | Lakshmanamurthy et al. |
| 2007/0025175 A1* | 2/2007 | Liu et al. ....................... 365/233 |

(Continued)

OTHER PUBLICATIONS

Cheng, Xuejiao. Application of QDR II -Based Storage Technology in the DSO. University of Electronic Science and Technology, Sep. 2009, pp. 21-40.

(Continued)

*Primary Examiner* — Vincent Tran
(74) *Attorney, Agent, or Firm* — Ling Wu; Stephen Yang; Ling and Yang Intellectual Property (57) ABSTRACT

A Quad-Data Rate (QDR) controller and an implementation method thereof are disclosed in the present invention. The controller includes: an arbiter, a control state machine, a read data sampling clock generating module, a read data path module and a read data path calibrating module. The arbiter arbitrates commands and data according to the state of the control state machine; the read data sampling clock generating module generates read data sampling clocks with the same source and same frequency and different phases; the read data path calibrating module determines, among the generated read data sampling clocks, sampling clocks of positive edge data and negative edge data for the read data path module to read data by reading training words when the control state machine is in "read data path calibrating state"; the read data path module synchronizes the positive edge read data and negative edge data in a non-system clock domain to the system clock domain according to the determined sampling clocks. The present invention has a shorter delay and does not need any programmable delay element, and is easy to implement.

11 Claims, 6 Drawing Sheets

(56) References Cited

U.S. PATENT DOCUMENTS

| | | | |
|---|---|---|---|
| 2008/0112235 A1* | 5/2008 | Hein et al. | 365/191 |
| 2009/0168552 A1* | 7/2009 | Yoon et al. | 365/189.07 |
| 2009/0322770 A1* | 12/2009 | Bae | 345/522 |
| 2010/0165758 A1* | 7/2010 | Park et al. | 365/193 |
| 2010/0310029 A1* | 12/2010 | Na | 375/371 |

OTHER PUBLICATIONS

Liu, Yao etc. Design of QDR SRAM Controller and Realization of FPGA Modern Electronics Technique, Feb. 2007, No. 2, pp. 11-12, 16, ISSN 1004-373X.

International Search Report for PCT/CN2010/080140 dated Feb. 28, 2011.

* cited by examiner

QUAD-DATA RATE CONTROLLER AND IMPLEMENTING METHOD THEREOF

TECHNICAL FIELD

The present invention relates to the technical field of data transmission, and particularly to a Quad-Data Rate (QDR) controller and an implementation method thereof.

BACKGROUND OF THE RELATED ART

QDRII SRAM (Quad-Data Rate Static Random Access Memory) element is developed for meeting a higher bandwidth storage requirement and aimed at network and telecommunication applications. A basic QDR architecture has independent read data path and written data path so as to facilitate a simultaneous operation. During each clock cycle, both of the paths transmit two words using Double Data Rate (DDR), wherein one is transmitted along the positive edge of the clock, and the other is transmitted along the negative edge of the clock. Data with four bus widths (two for reading and two for writing) will be transmitted in each clock cycle, and this is the origin of the quad-data rate.

There are two common methods for designing the QDR controller, as bellows:

(1) the read data of the QDRII SRAM are synchronized to the system clock domain using asynchronous FIFO (First In First Out), the advantage of this method is simplicity and reliability, and its drawback is long reading delay, which is generally longer than 8 clock cycles;

(2) the read data of the QDRII SRAM are delayed and synchronized to the system clock domain using a programmable delay element, the advantage of this method is short reading delay, which is 6-8 clock cycles in general, and its drawback is that the QDR controller can not be implemented in a case where no programmable delay element is configured by some ASIC factories.

SUMMARY OF THE INVENTION

The technical problem the present invention solves is to provide a quad-data rate (QDR) controller and an implementation method thereof to overcome the shortcomings of the existing QDR controller of long read delay time or dependence on a programmable delay element, so as to realize QDR data reading with a shorter reading delay and without any programmable delay element.

The present invention provides a QDR controller, comprising: an arbiter, a control state machine, a read data sampling clock generating module, a read data path module and a read data path calibrating module;

the arbiter is configured to arbitrate commands and data according to a state of the control state machine;

the control state machine is configured to manage the state of the control state machine and provide state basis for the arbiter to arbitrate commands and data;

the read data sampling clock generating module is configured to generate read data sampling clocks with a same source and a same frequency and different phases;

the read data path calibrating module is configured to determine, among the generated read data sampling clocks, sampling clocks of positive edge data and negative edge data respectively for the read data path module to read data by reading training words when the control state machine is in "read data path calibrating state";

the read data path module is configured to synchronize positive edge read data and negative edge read data that are in a non-system clock domain to a system clock domain according to the sampling clocks determined by the read data path calibrating module.

The QDR controller further comprises:

a physical layer, which is configured to implement an execution of a specific command of the arbiter and an accessing operation on data by the read data path module.

a register management module, which is configure to process configuration information for the control state machine and a physical layer from a CPU.

The read data path calibrating module comprises: a calibration control state machine, a calibrating write command generator, a calibrating read command generator, a read data detector and a read data path selection signal generator; wherein:

the calibration control state machine is configured to: when a state indication of the control state machine is in "read data path calibrating state", jump to a write training word state; and jump to a read training word state after a calibrating write command is completed; and jump to a detect read training word state after a calibrating read command is completed; and jump to a read data path selection signal generating state after a detecting read training word is completed;

the calibrating write command generator is configured to: when the calibration control state machine jumps to the write training word state, generate the calibrating write command and a write training word, which are written into a QDRII SRAM element by the arbiter and the physical layer;

the calibrating read command generator is configured to: when the calibration control state machine jumps to the read training word state, generate a calibrating read command, which is written into the QDRII SRAM element by the arbiter and the physical layer;

the read data detector is configured to: when the calibration control state machine jumps to the detect read training word state, detect the consistency between the positive edge read data from the read data path module and training word positive edge data respectively, detect the consistency between the negative edge read data from the read data path module and training word negative edge data, and record a read data detection result;

the read data path selection signal generator is configured to: when the calibration control state machine jumps to a read data path selection signal generating state, generate a read data path selection signal according to the read data detection result recorded by the read data detector.

The read data sampling clocks with the same source and same frequency and different phases generated by the read data sampling clock generating module comprise 4 read data sampling clocks: sys_clk, sys_clk_90, sys_clk_180 and sys_clk_270.

A selection way of the read data path selection signal generator generating the read data path selection signal according to the read data detection result recorded by the read data detector comprises:

if read data sampled by the 4 read data sampling clocks are all consistent with the training words, selecting one of the 4 read data sampling clocks as a read data path for sampling the read data according to a number of clocks at which the sampled data are consistent with the training words in a system clock cycle, and a number of clocks at which the sampled data are consistent with the training words in a next system clock cycle;

if 3 read data and only the 3 read data among the read data sampled by the 4 sampling clocks are consistent with the training words, then selecting a middle clock among the three consistent continuous clocks as the read data path for sampling the read data;

if only 2 data or less than 2 data in the read data sampled by the 4 sampling clocks are consistent with the training words, reporting an error.

In the step of the read data path selection signal generator generating the read data path selection signal according the read data detection result recorded by the read data detector, if the read data sampled by the 4 read data sampling clocks are all consistent with the training words, then:

when the read data sampled by the 4 read data sampling clocks are all consistent with the training words during a system clock cycle, the read data path of the sampled read data of sys_clk__180 is selected;

when read data sampled by 3 out of the 4 read data sampling clocks are consistent with the training words during a system clock cycle, and read data sampled by 1 read data sampling clock are consistent with the training words during a next system clock cycle, the read data path of the sampled read data of sys_clk__270 is selected;

when read data sampled by 2 out of the 4 read data sampling clocks are consistent with the training words during a system clock cycle, and read data sampled by 2 read data sampling clocks are consistent with the training words during a next system clock cycle, the read data path of the sampled read data of sys_clk is selected;

when read data sampled by 1 out of the 4 read data sampling clocks are consistent with the training word during a system clock cycle, and read data sampled by 3 read data sampling clocks are consistent with the training words during a next system clock cycle, the read data path of the sampled read data of sys_clk__90 is selected.

The present invention also provides a method for implementing a QDR controller, comprising:

sampling read data using 4 clocks with same source and same frequency and different phases;

determining sampling clocks for the read data according to a result of sampled data of each clock in the 4 clocks;

synchronizing the read data to a system clock domain according to the determined sampling clocks.

Wherein, the 4 clocks with same source and same frequency and different phases comprises 4 read data sampling clocks: sys_clk, sys_clk__90, sys_clk__180 and sys_clk__270.

In the step of determining the sampling clocks for the read data according to the result of sampled data of each clock in the 4 clocks, a read data path calibrating module determines, among the generated read data sampling clocks, sampling clocks of positive edge data and negative edge data used when a read data path module reads data by reading training words when a control state machine of the QDR controller is in "read data path calibrating state".

The 4 clocks with the same source and same frequency and different phases comprises 4 read data sampling clocks: sys_clk, sys_clk__90, sys_clk__180 and sys_clk__270; the step of determining the sampling clocks for the read data according to the result of sampled data of each clock in the 4 clocks comprises the following situations:

if read data sampled by the 4 read data sampling clocks are all consistent with the training words, one of the 4 read data sampling clocks is selected as a read data path for sampling the read data according to a number of clocks at which the sampled data are consistent with the training words in a system clock cycle, and a number of clocks at which the sampled data are consistent with the training words in a next system clock cycle;

if 3 read data and only the 3 read data among the read data sampled by the 4 sampling clocks are consistent with the training words, then a middle clock among the three consistent continuous clocks is selected as the read data path for sampling the read data.

if only 2 read data or less than 2 read data in the read data sampled by the 4 sampling clocks are consistent with the training words, reporting an error.

Further, the step of selecting one of the 4 read data sampling clocks as the read data path for sampling the read data if read data sampled by the 4 read data sampling clocks are all consistent with the training words, according to the number of clocks at which the sampled data are consistent with the training words in a system clock cycle and the number of clocks at which the sampled data are consistent with the training words in a next system clock cycle comprises the following situations:

when data sampled by the 4 read data sampling clocks are all consistent with the training words during the system clock cycle, the read data path of the sampled read data of sys_clk__180 is selected;

when data sampled by 3 out of the 4 read data sampling clocks are consistent with the training words during the system clock cycle, and data sampled by 1 out of the 4 read data sampling clocks are consistent with the training words during the next system clock cycle, the read data path of the sampled read data of sys_clk__270 is selected;

when data sampled by 2 out of the 4 read data sampling clocks are consistent with the training words during a system clock cycle, and data sampled by 2 out of the 4 read data sampling clocks are consistent with the training words during the next system clock cycle, the read data path of the sampled read data of sys_clk is selected;

when data sampled by 1 out of the 4 read data sampling clocks are consistent with the training words during a system clock cycle, and data sampled by 3 out of the 4 read data sampling clocks are consistent with the training words during the next system clock cycle, the read data path of the sampled read data of sys_clk__90 is selected.

Compared with the existing technology, the method and apparatus according to the present invention reduce the reading delay of the QDR controller, thereby avoiding the dependence on a programmable delay element. The present invention has a shorter reading delay and does not need any programmable delay element, and is easy to implement.

PREFERRED EMBODIMENTS OF THE PRESENT INVENTION

In order to make the goal, technical schemes and advantages of the present invention more clear, the present invention will be further described in detail in combination with drawings bellow.

Figure 1:
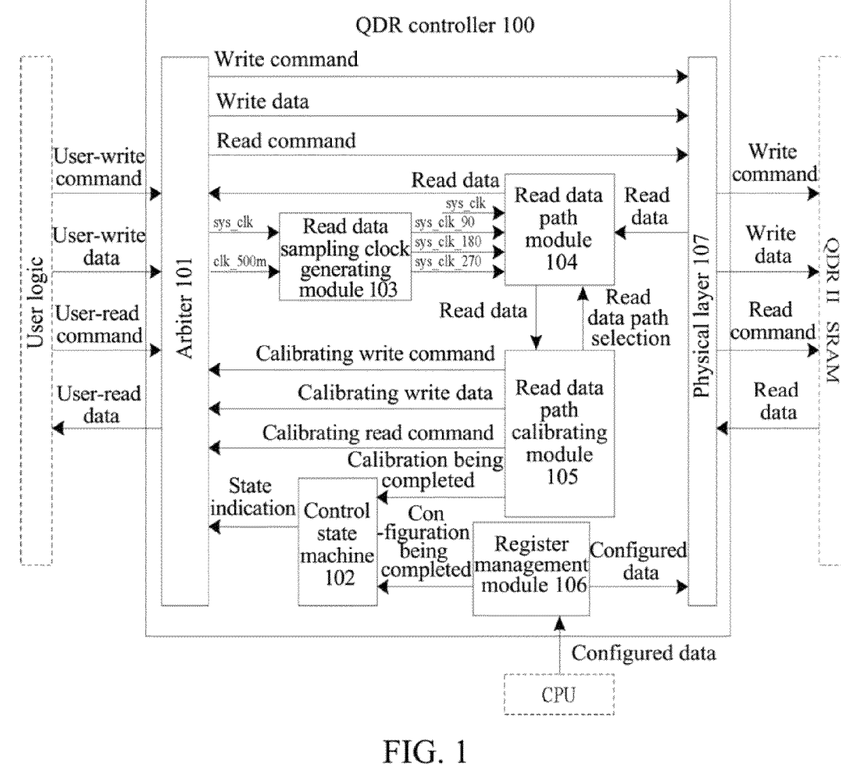
FIG. 1 is a schematic diagram of an apparatus for implementing a QDR controller according to the present invention.
Figure 2:
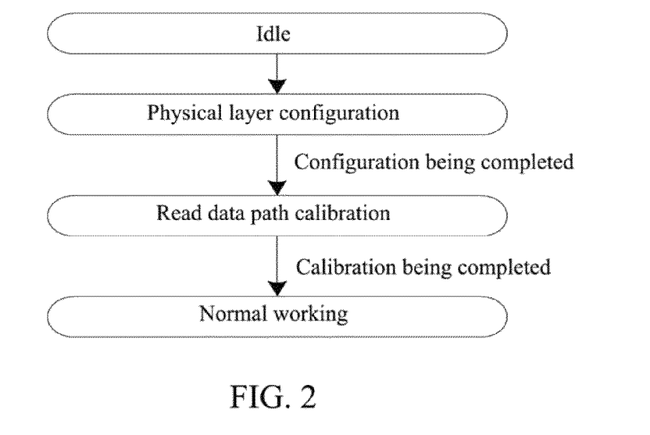
FIG. 2 is a schematic diagram of a control state machine according to the present invention.
Figure 5:
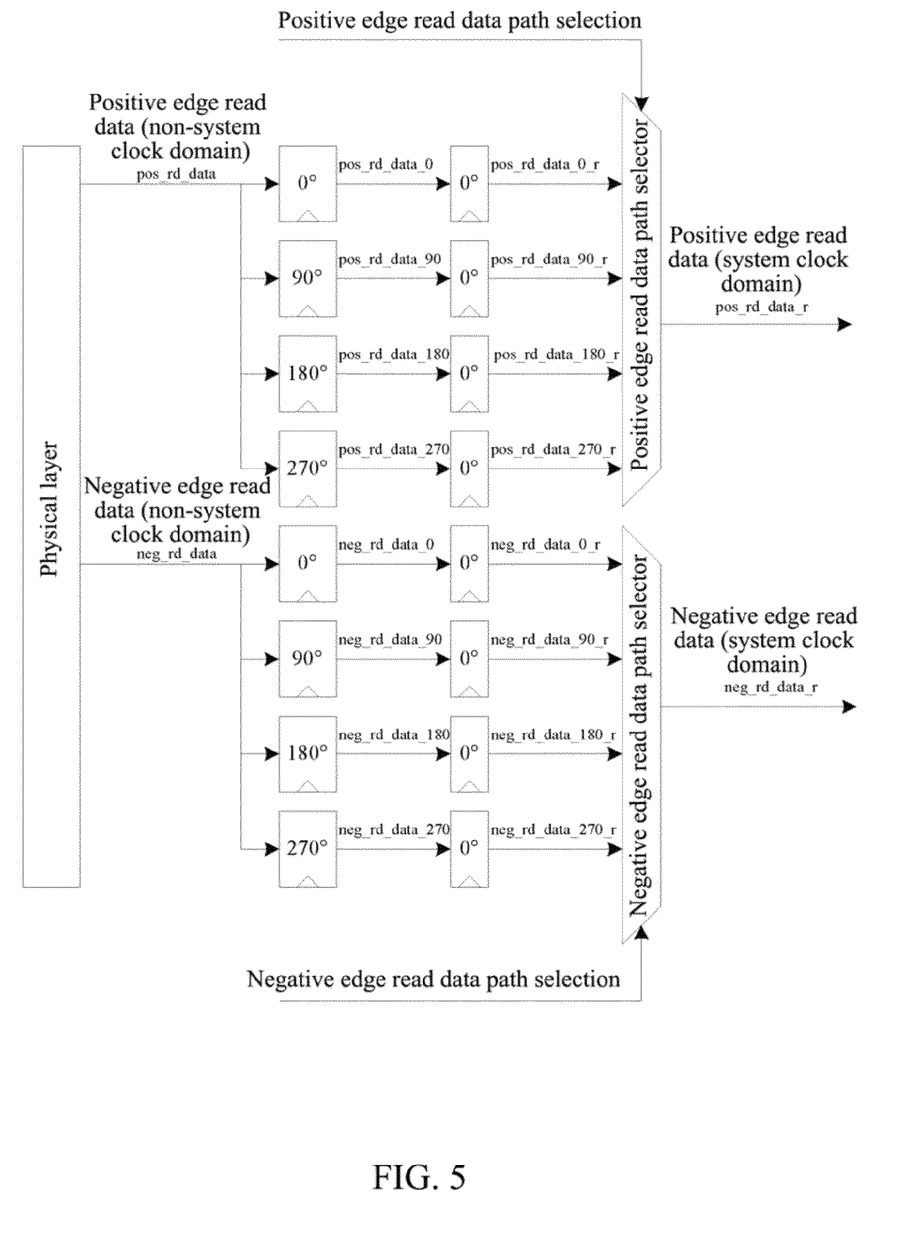
FIG. 5 is a schematic diagram of implementation of a read data path module.
Figure 6:
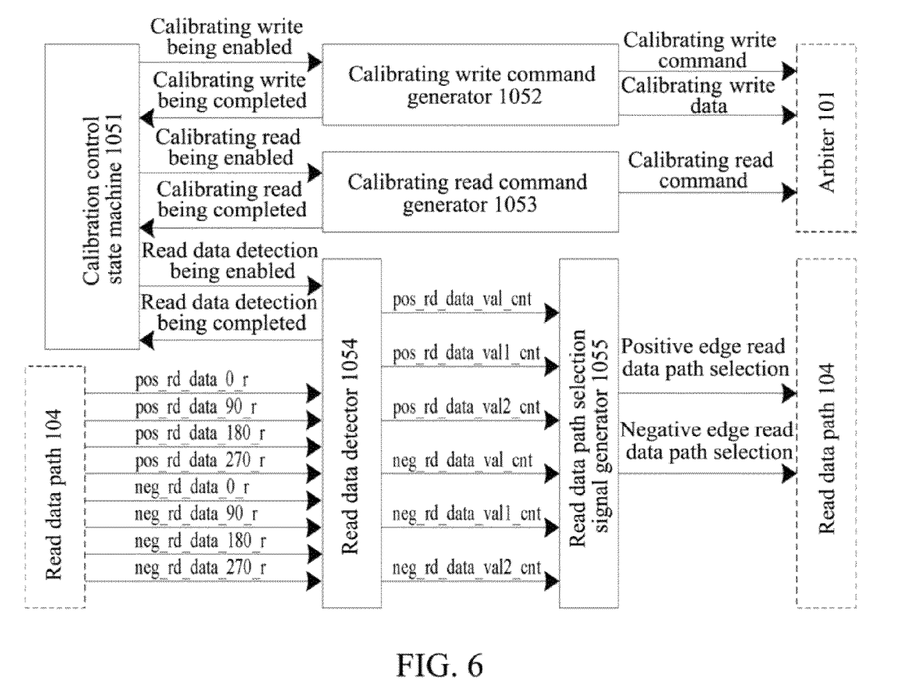
FIG. 6 is a schematic diagram of implementation of a read data path calibrating module according to the present invention.
Figure 7:
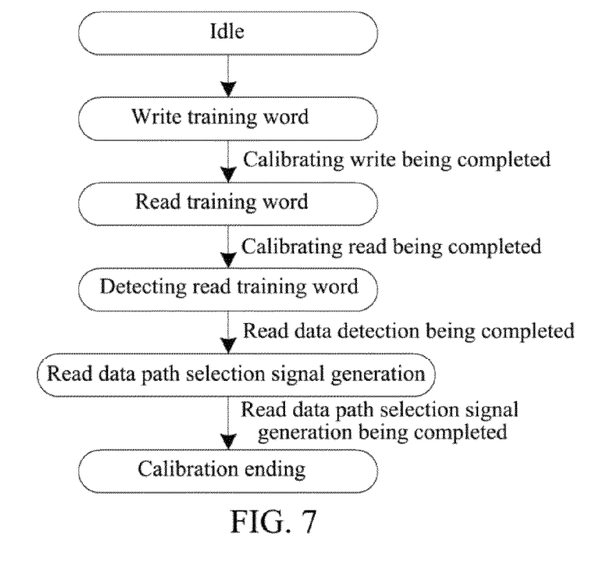
FIG. 7 is a schematic diagram of a read data path calibrating state machine according to the present invention.

As shown in FIG. 1, a block diagram for implementing a QDR controller according to the present invention is shown, and the QDR controller 100 comprises:

an arbiter 101, which is configured to arbitrate commands and data according to a state indication of a control state machine 102;

the control state machine 102, as shown in FIG. 1 and FIG. 2, which is configured to manage each state of the QDR controller, and provide basis for the arbiter 101 to arbitrate commands and data. Wherein, there are 4 states controlled by the control state machine 102: an idle state, a physical layer configuration state, a read data path calibrating state and a normal working state.

a read data sampling clock generating module 103, which is configured to generate read data sampling clocks with same source and same frequency and different phases: sys_clk_90, sys_clk_180 and sys_clk_270;

a read data path module 104, as shown in FIG. 1 and FIG. 5, which is configured to synchronize the positive edge read data and the negative edge read data in the non-system clock domain to the system clock domain;

a read data path calibrating module 105, as shown in FIG. 1, FIG. 6 and FIG. 7, which is configured to determine the sampling clocks of the positive edge data and the negative edge data by reading training words;

a register managing module 106, as shown in FIG. 1, which is configured to process the configuration information from a CPU;

a physical layer 107, as shown in FIG. 1, which is configured to implement operations of executing specific command and accessing data; the section of the physical layer is not included in the scope of the description of the present invention but is needed to complete the work.

FIG. 2 shows the idle state, physical layer configuration state, read data path calibrating state and normal working state that are controlled by the control state machine 102, and the changing process of each state:

when the system is reset or the system reset is released, the control state machine 102 is in idle state;

after the system reset is released, the system automatically jumps to the physical layer configuration state;

in the physical layer configuration state, relevant parameters of the physical layer should be configured, and the system jumps to a read data path calibrating state after this configuration;

in the read data path calibrating state, the sampling clocks of positive edge read data and negative edge read data are determined respectively according to a calibrating rule, and the system jumps to a normal working state after this calibration;

in the normal working state, the user may read and write QDRII SRAM.

The commands and data arbitrated by the arbiter 101 comprises: user-write command, user-write data, user-read command, calibrating write command, calibrating write data and calibrating read command. The arbitration instruction in the above arbitrating process is made based on the state of the control state machine 102, wherein:

in the idle state or physical layer configuration state, the write command, write data, read command and user-read data output by the arbiter 101 are invalid;

in the read data path calibrating state, the arbiter 101 chooses the calibrating write command, the calibrating write data and the calibrating read command to output as the write command, the write data and the read command respectively, while the output user-read data are invalid;

in the normal working state, the arbiter 101 chooses the user-write command, the user-write data and user-read command to output as the write command, the write data and the read command respectively, and outputs the read data from the read data path module 104 as the user-read data.

Figure 3:
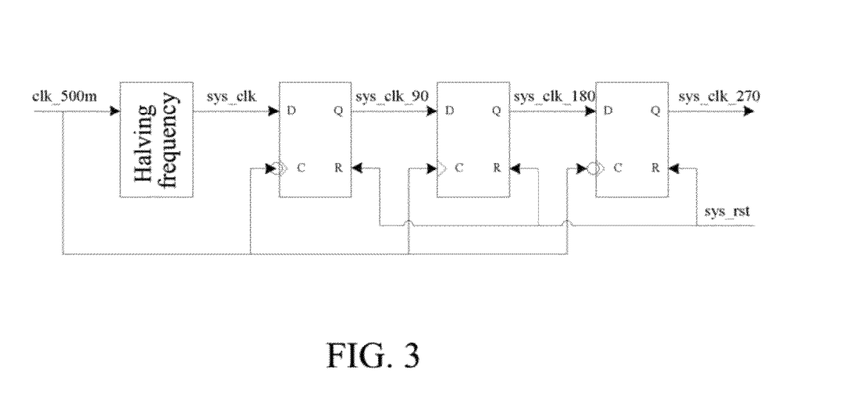
FIG. 3 is a schematic diagram of implementation of a read data sampling clock generating module according to the present invention.
Figure 4:
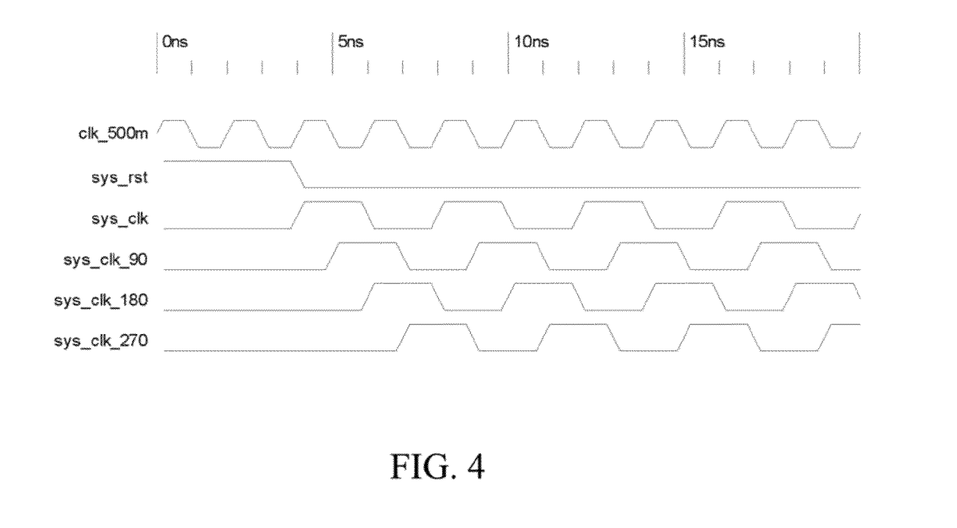
FIG. 4 is a schematic diagram of generation of a read data sampling clock according to the present invention.

As shown in FIG. 1, FIG. 3 and FIG. 4, the specific way of the read data sampling clock generating module 103 generating the read data sampling clocks, sys_clk_90, sys_clk_180 and sys_clk_270, is as follows:

the sys_clk_90 is obtained from the negative sampling sys_clk of the clk_500m;

the sys_clk_180 is obtained from the positive sampling sys_clk_90 of the clk_500m;

the sys_clk_270 is obtained from the negative sampling sys_clk_180 of the clk_500m;

the sys_clk is a 250 MHz clock, and the sys_clk is obtained from the clk_500m by halving frequency;

wherein the clk_500m is a 500 MHz clock.

As shown in FIG. 1, FIG. 6 and FIG. 7, the read data path calibrating module 105 determines the sampling clocks of the positive edge data and negative edge data respectively by reading training words, and the read data path calibrating module 105 specifically further comprises the following submodules:

a calibration control state machine 1051, which is configured to manage every state of the read data path calibration;

a calibrating write command generator 1052, which is configured to generate a calibrating write command and a write training word;

a calibrating read command generator 1053, which is configured to generate a calibrating read command;

a read data detector 1054, which is configured to detect the consistency between the read data output by each read data path module 104 and the training words, and record the detection results;

a read data path selection signal generator 1055, which is configured to generate a read data path selection signal according to the read data detection result recorded by the read data detector 1054.

Based on the QDR controller shown in FIG. 1, the method for implementing the QDR controller according to the present invention is as shown in FIG. 1, FIG. 5, FIG. 6, FIG. 7, FIG. 8 and FIG. 9, and the core idea of the method is: read data are sampled using 4 clocks with same source and same frequency and different phases, sampling clocks for the read data are determined according to the result of sampled data of each clock, and the read data are synchronized to the system clock domain. The specific process of implementing the QDR controller will be specifically described in combination with a QDR controller shown in FIG. 1.

As shown in FIG. 7 and in combination with FIG. 6, the process of the read data path calibrating module 105 performing read data path calibration is described.

The initial state of the calibration control state machine 1051 in the read data path calibrating module 105 is in idle state, and when the state indication of the control state machine 102 of the QDR controller is "read data path calibrating state", the calibration control state machine 1051 jumps to a write training word state;

when the state of the calibration control state machine 1051 is the write training word state, the calibrating write command generator 1052 is enabled, the calibrating write command generator 1052 generates a calibrating write command and a write training word which are written into a QDRII SRAM element by the arbiter 101 and the physical layer 107, and the calibration control state machine 1051 jumps to a read training word state after the calibrating write command is completed;

when the state of the calibration control state machine 1051 is the read training word state, the calibrating read command generator 1053 is enabled, the calibrating read command generator 1053 generates a calibrating read command which is written into a QDRII SRAM element by the arbiter 101 and the physical layer 107, and the calibration control state machine 1051 jumps to a read training word detecting state after the calibrating read command is completed;

as shown in FIG. 1 and FIG. 5, the QDRII SRAM element, after receiving the read training word command, sends read data to the physical layer, the physical layer samples the read data from the QDRII SRAM element and outputs positive edge read data pos_rd_data and negative edge read data neg_rd_data are output, wherein the pos_rd_data and the neg_rd_data are non-system clock domain.

As shown in FIG. 5, the processing of the read data in the read data path module 104 will be described by taking the positive edge read data as an example: sys_clk, sys_clk_90, sys_clk_180 and sys_clk_270 sample the positive edge read data pos_rd_data from the physical layer respectively, and obtain sampled data pos_rd_data_0, pos_rd_data_90, pos_rd_data_180 and pos_rd_data_270 respectively;

next, the system clock sys_clk samples pos_rd_data_0, pos_rd_data_90, pos_rd_data_180 and pos_rd_data_270, and obtains pos_rd_data_0_r, pos_rd_data_90_r, pos_rd_data_180_r and pos_rd_data_270_r respectively;

the processing mode for the negative edge read data is similar to that for the positive edge read data, referring to FIG. 5.

As shown in FIG. 1, FIG. 6 and FIG. 7, when the state of the calibration control state machine 1051 is the detect read training word state, the read data detector 1054 is enabled, the read data detector 1054 detects the consistency between the positive edge read data pos_rd_data_0_r, pos_rd_data_90_r, pos_rd_data_180_r and pos_rd_data_270_r from the read data path module 104 and the training word positive edge data respectively, detects the consistency between the negative edge read data neg_rd_data_0_r, neg_rd_data_90_r, neg_rd_data_180_r and neg_rd_data_270_r from the read data path module 104 and the training word negative edge data, and records the detection results.

Figure 9:
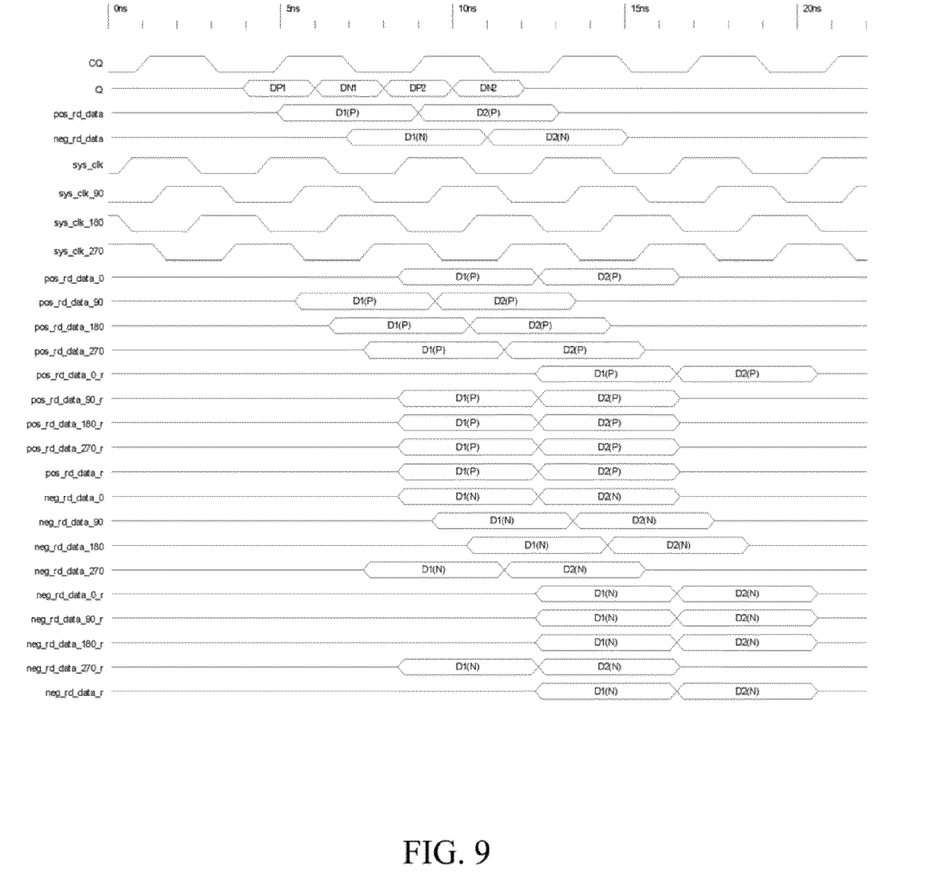
FIG. 9 is a schematic diagram of case 2 of selection of the read data path clock according to the present invention.

By taking the positive edge data in FIG. 9 as an example, the read data detector 1054 firstly detects that the pos_rd_data_90_r, pos_rd_data_180_r, pos_rd_data_270_r are consistent with the training word positive edge data in a single system clock cycle, and then detects that the pos_rd_data_0_r is consistent with the training word positive edge data in the next system clock cycle, and records a result as:

the read data sampled by 4 sampling clocks are all consistent with the training word positive edge data, the data sampled by 3 clocks are consistent with the training word positive edge data in a system clock cycle, and the data sampled by 1 clock are consistent with the training word positive edge data in the next system clock cycle.

Figure 8:
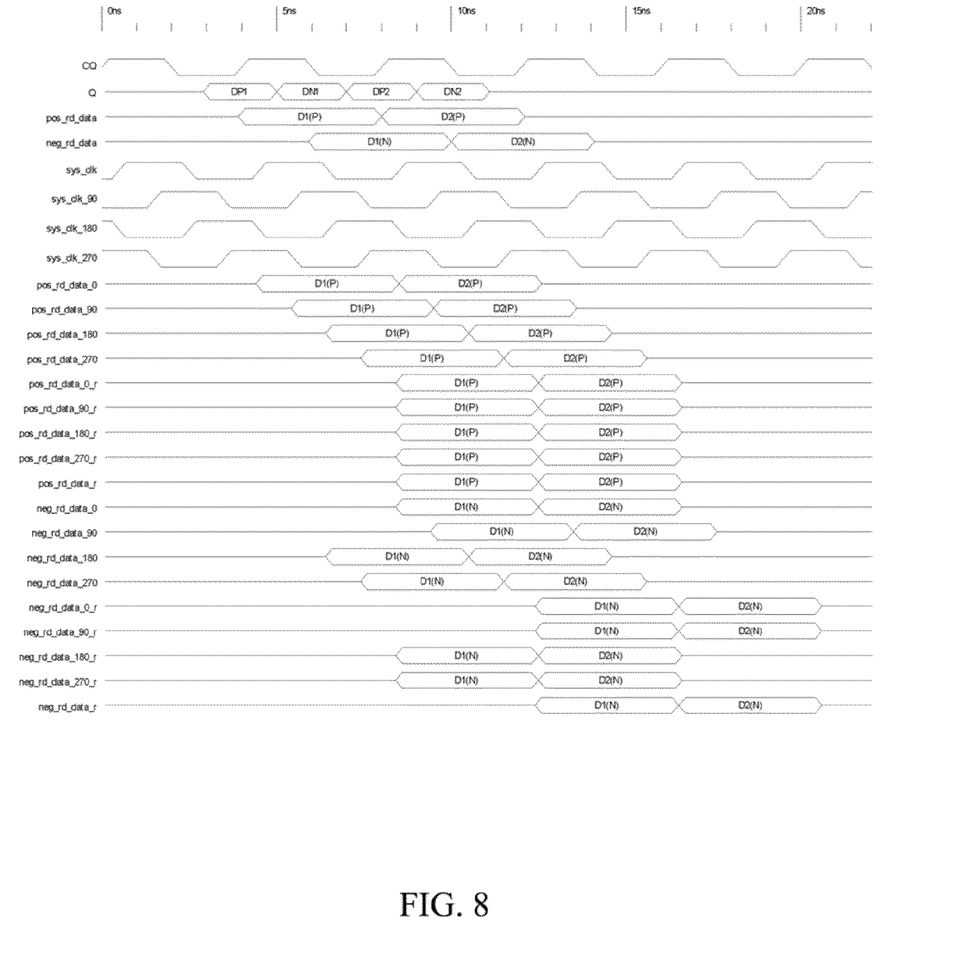
FIG. 8 is a schematic diagram of case 1 of selection of the read data path clock according to the present invention.

After the read training word detection is completed, the calibration control state machine 1054 jumps to a read data path selection signal generating state. As shown in FIG. 1, FIG. 6 and FIG. 7, when the state of the calibration control state machine 1051 is the read data path selection signal generating state, the read data path selection signal generator 1055 is enabled, the read data path selection signal generator 1055 generates a read data path selection signal according to the read data detection result recorded by the read data detector 1054. The way of generating the read data path selection signal is as follows:

if the read data sampled by the 4 sampling clocks are all consistent with the training words, the read data path selection may have the following situations:

1) if the data sampled by the 4 clocks are all consistent with the training words during a system clock cycle, the read data path of the sampled read data of sys_clk_180 is selected, referring to the positive edge data in FIG. 8;

2) if the data sampled by 3 clocks are consistent with the training words during a system clock cycle, and the data sampled by 1 clocks are consistent with the training words during the next system clock cycle, the read data path of the sampled read data of sys_clk_270 is selected, referring to the positive edge data in FIG. 9;

3) if the data sampled by 2 clocks are consistent with the training words during a system clock cycle, and the data sampled by 2 clocks are consistent with the training words during the next system clock cycle, the read data path of the sampled read data of sys_clk is selected, referring to the negative edge data in FIG. 8;

4) if the data sampled by 1 clock are consistent with the training words during a system clock cycle, and the data sampled by 3 clocks are consistent with the training words during the next system clock cycle, the read data path of the sampled read data of sys_clk_90 is selected, referring to the negative edge data in FIG. 9.

If 3 read data and only the 3 data of the read data sampled by the 4 sampling clocks are consistent with the training words, then a middle clock among the three consistent continuous clocks is selected as the read data path for sampling the read data.

For example, when the order of the clocks is . . . sys_clk, sys_clk_90, sys_clk_180, sys_clk_270, sys_clk, sys_clk_90, sys_clk_180, sys_clk_270 . . . , if the data sampled by 3 clocks are the same with expected values (training words), and the 3 clocks are continuous, then the middle one of the 3 clocks is selected. For example, in case 1, among sys_clk, sys_clk_90, sys_clk_180, the sys_clk_90 is selected; in case 2, among sys_clk_90, sys_clk_180, sys_clk_270, the sys_clk_180 is selected; in case 3, among sys_clk_180, sys_clk_270, sys_clk, the sys_clk_270 is selected; in case 4, among sys_clk_270, sys_clk, sys_clk_90, the sys_clk is selected.

If only 2 data or less than 2 data in the read data sampled by 4 sampling clocks are consistent with the training words, an error is reported.

After the generation of the read data path selection signal is completed, the calibration control state machine 1051 jumps to a calibration ending state, the read data path calibration ends, and the QDR controller state machine 102 jumps to the normal working state.

To sum up, the present invention solves the problem of long reading delay and dependence on a programmable delay element in a QDR controller, and provides a method for designing a QDR controller with a shorter reading delay and without a programmable delay element. Moreover the implementation apparatus provided by the present invention may be widely applied in FPGA and ASIC logic circuits.

What is described above are only examples of the present invention, and is not intended to limit the present invention. For those skilled in the art, the present invention may have various changes and variations. Any modification, equivalent substitution and improvement made within the spirit and principle of the present invention should be included in the scope of the claims of the present invention.

INDUSTRIAL APPLICABILITY

By providing the QDR controller comprising an arbiter, a control state machine, a read data sampling clock generating module, a read data path module and a read data path calibrating module and the implementation method thereof, the present invention overcomes the shortcoming of the QDR controller in existing art, i.e., long reading delay or dependence on a programmable delay element, so as to realize the QDR data reading and writing with a shorter reading delay and without any programmable delay element.

The implementation apparatus and method provided by the present invention may be widely applied in FPGA and ASIC logic circuits, and are easy to implement.

The invention claimed is:

1. A Quad-Data Rate (QDR) controller, comprising: an arbiter, a control state machine, a read data sampling clock generating module, a read data path module and a read data path calibrating module;
    the arbiter is configured to arbitrate commands and data according to a state of the control state machine;
    the control state machine is configured to manage a state of a controller and provide state basis for the arbiter to arbitrate the commands and the data;
    the read data sampling clock generating module is configured to generate read data sampling clocks with a same source, a same frequency and different phases;
    the read data path calibrating module is configured to determine, among the generated read data sampling clocks, sampling clocks of positive edge data and negative edge data respectively when the read data path module reads data by reading training words when the control state machine is in "read data path calibrating state";
    the read data path module is configured to synchronize positive edge read data and negative edge read data that are in a non-system clock domain to a system clock domain according to the sampling clocks determined by the read data path calibrating module.

2. The controller according to claim 1, further comprising:
    a register management module, which is configured to process configuration information for the control state machine and a physical layer from a CPU;
    the physical layer, which is configured to implement an execution of a specific command of the arbiter and an accessing operation to data by the read data path module.

3. The controller according to claim 1, wherein, the read data sampling clocks with the same source and same frequency and different phases generated by the read data sampling clock generating module comprise 4 read data sampling clocks: sys_clk, sys_clk_90, sys_clk_180 and sys_clk_270.

4. The controller according to claim 1, wherein, the read data path calibrating module comprises: a calibration control state machine, a calibrating write command generator, a calibrating read command generator, a read data detector and a read data path selection signal generator; wherein:
    the calibration control state machine is configured to: when a state indication of the control state machine is in the "read data path calibrating state", jump to a write training word state; and jump to a read training word state after a calibrating write command is completed; and jump to a detect read training word state after a calibrating read command is completed; and jump to a read data path selection signal generating state after a read training word detection is completed;
    the calibrating write command generator is configured to: when the calibration control state machine jumps to the write training word state, generate the calibrating write command and a write training word, which are written into a QDRII SRAM element by the arbiter and the physical layer;
    the calibrating read command generator is configured to: when the calibration control state machine jumps to the read training word state, generate a calibrating read command, which is written into the QDRII SRAM element by the arbiter and the physical layer;
    the read data detector is configured to: when the calibration control state machine jumps to the detect training word state, respectively detect the consistency between the positive edge read data from the read data path module and training word positive edge data, detect the consistency between the negative edge read data from the read data path module and training word negative edge data, and record a read data detection result;
    the read data path selection signal generator is configured to: when the calibration control state machine jumps to the read data path selection signal generating state, generate a read data path selection signal according to the read data detection result recorded by the read data detector.

5. The controller according to claim 4, wherein the read data sampling clocks with the same source and same frequency and different phases generated by the read data sampling clock generating module comprise 4 read data sampling clocks: sys_clk, sys_clk_90, sys_clk_180 and sys_clk_270;
    a selection way of the read data path selection signal generator generating the read data path selection signal according to the read data detection result recorded by the read data detector comprises:
    if read data sampled by the 4 read data sampling clocks are all consistent with the training word, selecting one of the 4 read data sampling clocks as a read data path for sampling the read data, according to a number of clocks by which the sampled data are consistent with the training word in a system clock cycle and a number of clocks by which the sampled data are consistent with the training word in a next system clock cycle;
    if the read data sampled by 3 and only 3 in the 4 read data sampling clocks are consistent with the training word, then selecting a middle clock among the 3 continuous clocks with consistent data as the read data path for sampling the read data;
    if the read data sampled by only 2 or less than 2 in the 4 sampling clocks are consistent with the training words, reporting an error.

6. The controller according to claim 5, wherein, in the step of the read data path selection signal generator generating the read data path selection signal according the read data detection result recorded by the read data detector, if the read data sampled by the 4 read data sampling clocks are all consistent with the training word, then:
    when the read data sampled by the 4 read data sampling clocks are all consistent with the training word during a system clock cycle, the read data path of the sampled read data of sys_clk_180 is selected;

when the read data sampled by 3 out of the 4 read data sampling clocks are consistent with the training word during a system clock cycle, and the read data sampled by 1 read data sampling clock are consistent with the training word during a next system clock cycle, the read data path of the sampled read data of sys_clk_270 is selected;

when the read data sampled by 2 out of the 4 read data sampling clocks are consistent with the training word during a system clock cycle, and the read data sampled by 2 read data sampling clocks are consistent with the training word during a next system clock cycle, the read data path of the sampled read data of sys_clk is selected;

when the read data sampled by 1 out of the 4 read data sampling clocks are consistent with the training word during a system clock cycle, and the read data sampled by 3 read data sampling clocks are consistent with the training word during a next system clock cycle, the read data path of the sampled read data of sys_clk_90 is selected.

7. A method for implementing a Quad-Data Rate (QDR) controller, comprising:
sampling read data using 4 clocks with a same source and a same frequency and different phases in a QDR controller;
determining a sampling clock for the read data according to a result of sampling read data of each clock in the 4 clocks when a control state machine of the QDR controller is in "read data path calibrating state";
synchronizing the read data to a system clock domain according to the determined sampling clock.

8. The method according to claim 7, wherein, the 4 clocks with a same source and a same frequency and different phases comprises 4 read data sampling clocks: sys_clk, sys_clk_90, sys_clk_180 and sys_clk_270.

9. The method according to claim 8, wherein,
the step of selecting one of the 4 read data sampling clocks as the read data path for sampling the read data if read data sampled by the 4 read data sampling clocks are all consistent with the training words, according to the number of clocks by which the sampled data are consistent with the training word in a system clock cycle and the number of clocks by which the sampled data are consistent with the training word in a next system clock cycle comprises the following situations:
when data sampled by the 4 read data sampling clocks are all consistent with the training word during the system clock cycle, the read data path of the sampled read data of sys_clk_180 is selected;
when data sampled by 3 out of the 4 read data sampling clocks are consistent with the training word during the system clock cycle, and data sampled by 1 out of the 4 read data sampling clocks are consistent with the training word during the next system clock cycle, the read data path of the sampled read data of sys_clk_270 is selected;
when data sampled by 2 out of the 4 read data sampling clocks are consistent with the training word during a system clock cycle, and data sampled by 2 out of the 4 read data sampling clocks are consistent with the training word during the next system clock cycle, the read data path of the sampled read data of sys_clk is selected;
when data sampled by 1 out of the 4 read data sampling clocks are consistent with the training words during a system clock cycle, and data sampled by 3 out of the 4 read data sampling clocks are consistent with the training words during the next system clock cycle, the read data path of the sampled read data of sys_clk_90 is selected.

10. The method according to claim 7, wherein, in the step of determining the sampling clock for the read data according to the result of sampling read data of each clock in the 4 clocks, a read data path calibrating module determines, among the generated read data sampling clocks, sampling clocks of positive edge data and negative edge data used when a read data path module reads data by reading training words when a control state machine of the QDR controller is in "read data path calibrating state".

11. The method according to claim 7, wherein,
the 4 clocks with the same source and the same frequency and different phases comprises 4 read data sampling clocks: sys_clk, sys_clk_90, sys_clk_180 and sys_clk_270; the step of determining the sampling clocks for the read data according to the result of sampling read data of each clock in the 4 clocks comprises following situations:
if read data sampled by the 4 clocks are all consistent with a training word, one of the 4 clocks is selected as a read data path for sampling the read data according to a number of clocks by which the sampled data are consistent with the training word in a system clock cycle, and a number of clocks by which the sampled data are consistent with the training word in a next system clock cycle;
if the read data sampled by 3 and only 3 in the 4 clocks are consistent with the training word, then selecting a middle clock among the 3 continuous clocks with consistent data as the read data path for sampling the read data;
if the read data sampled by only 2 or less than 2 in the 4 sampling clocks are consistent with the training words, reporting an error.

* * * * *